July 21, 1964 R. V. RHOADS ETAL 3,141,634
DRONE CONTROL SYSTEM
Filed March 23, 1951 3 Sheets-Sheet 1

INVENTORS:
REX V. RHOADES
FREDERICK STEVENS

By Herbert E. Metcalf
THEIR PATENT ATTORNEY

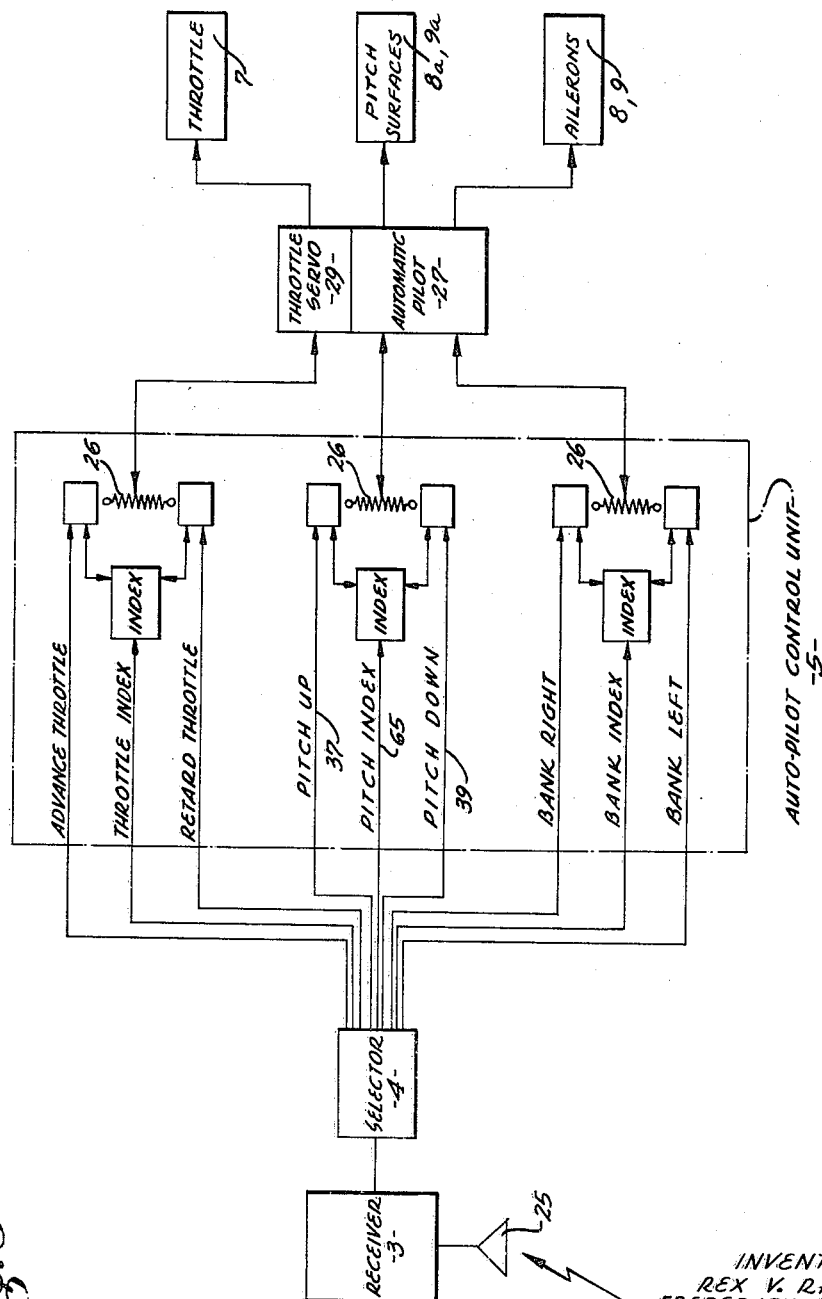

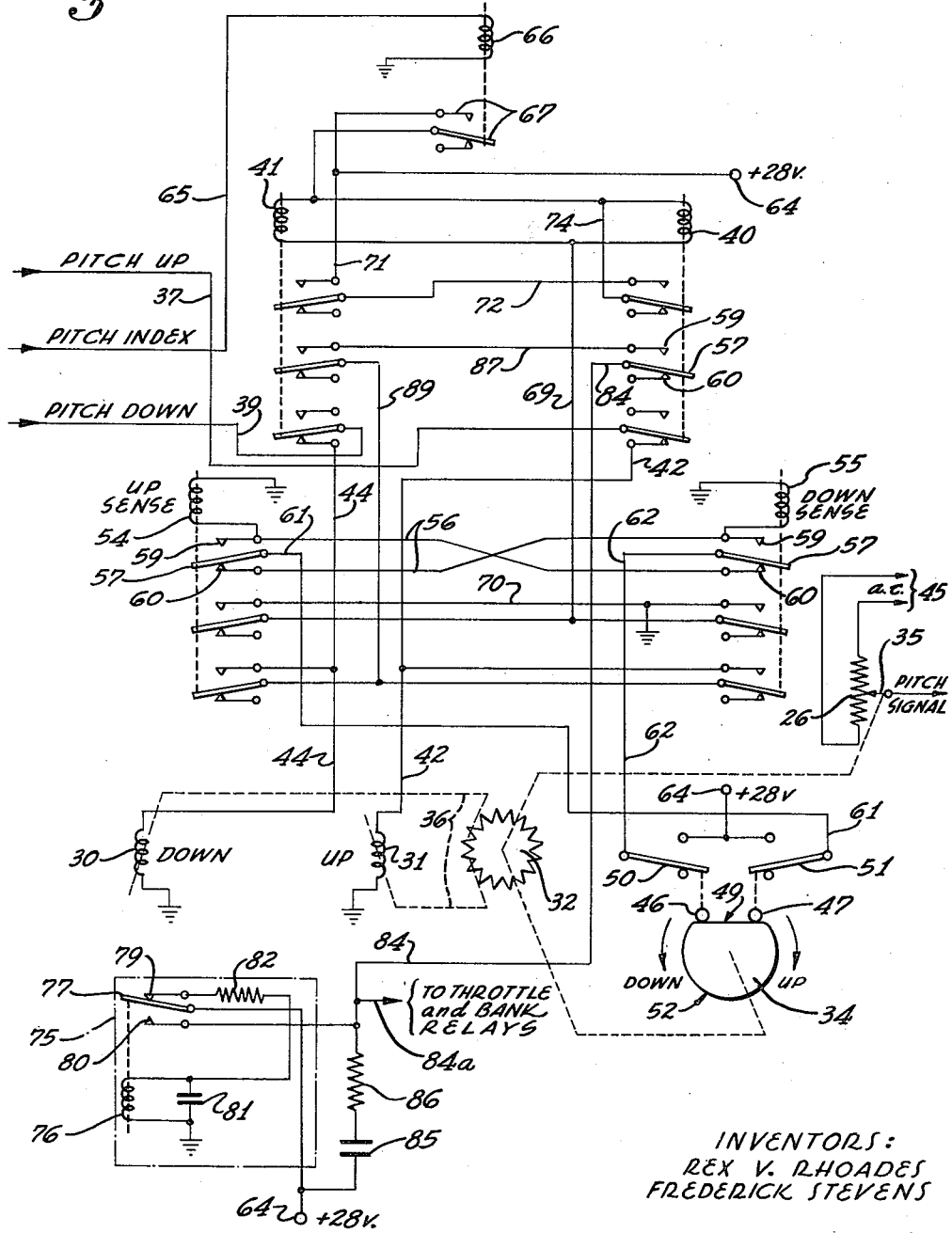

United States Patent Office 3,141,634
Patented July 21, 1964

3,141,634
DRONE CONTROL SYSTEM
Rex V. Rhoades, Redondo Beach, and Frederick Stevens, Long Beach, Calif., assignors to Northrop Corporation, Hawthorne, Calif., a corporation of California
Filed Mar. 23, 1951, Ser. No. 217,102
16 Claims. (Cl. 244—14)

This invention relates to remote control systems, and more particularly to improvements in the means and method of controlling a drone aircraft through a remote radio control system.

Various remote aircraft control systems at present use an electrical automatic pilot to which signals are fed by means of transmitted radio waves having predetermined modulation frequencies respectively assigned to operate various control circuits in a receiver, these control circuits being connected to corresponding auto-pilot signal input circuits for the desired response of the aircraft attitude. Other functions besides changes in flight attitude of the controlled craft are similarly effected, such as lowering and raising of landing gear and turning on and off of automatic altitude control, for example.

The accuracy of response of the controlled attitude circuits in systems heretofore used is adversely affected by signal frequency changes, variations in power supply, variable electrical characteristics of components, spurious signals resulting from noise disturbances, and the like. These factors contribute to what is known as "zero-drift," a condition where the controlled object becomes undesirably out of position from the setting of the remote control members after a period of time.

If the attitude control signals, i.e., those controlling the pitch, turn, bank, and speed, of the aircraft are in the form of definite "on-off" movements, the above mentioned fluctuations and frequency drifting will not have to be taken into account, since extremely stable operation of a continuous function is not necessary. With incremental movements transmitted to the input members of the attitude controlling system, synchronization of the controlled object with the remote control unit is more accurately obtained than with a "continuously proportional" system.

It is, therefore, an object of the present invention to control remotely and incrementally the references of aircraft control systems by means of pulses. To further insure exact correspondence between the remotely controlled aircraft attitude and the transmitter control unit which is responsible for the guidance, it is another object of this invention to provide a synchronizing feature by means of pulses, this synchronizing feature (herein called "indexing") operating automatically to return a remotely controlled reference function to a predetermined index position, if a discrepancy of any magnitude exists, when the particular control unit for that function is moved to index position. Other objects and advantages will be apparent upon reading the detailed description of specific apparatus disclosed herein.

Briefly, the present invention comprises producing on-off control pulses, relaying these pulses through a remote transmitter to a receiver mounted in an aircraft whose attitude is to be controlled, and automatically transferring the pulses into incremental control movements of an attitude controlling member in the aircraft. The necessary plurality of control functions is established by means of separate audio frequency modulation channels, as is well known, together with tuned filters at the receiving end for decoding and applying the control pulse signals to the proper controlling equipment. Indexing is accomplished by means of a separate control pulse which connects a pulsing relay, through various holding and directional relays, into the same control circuits through which the normal control pulses operate, to actuate a control function which is out of synchronism in the proper direction to bring it back into synchronism at the index position and stop it there.

Our invention may be more fully understood by reference to the accompanying drawings, shown by way of illustration and not limitation, wherein:

FIGURE 3 is a schematic diagram showing, in block form, a receiver and selector unit mounted in the controlled craft and operating on the signals received from the transmitting equipment in FIGURE 2, an autopilot control unit connected to the selector, and autopilot units connected to the control surfaces.

FIGURE 4 is a schematic diagram showing, in detail, one of the indexing circuits in the autopilot control unit.

Figure 1:
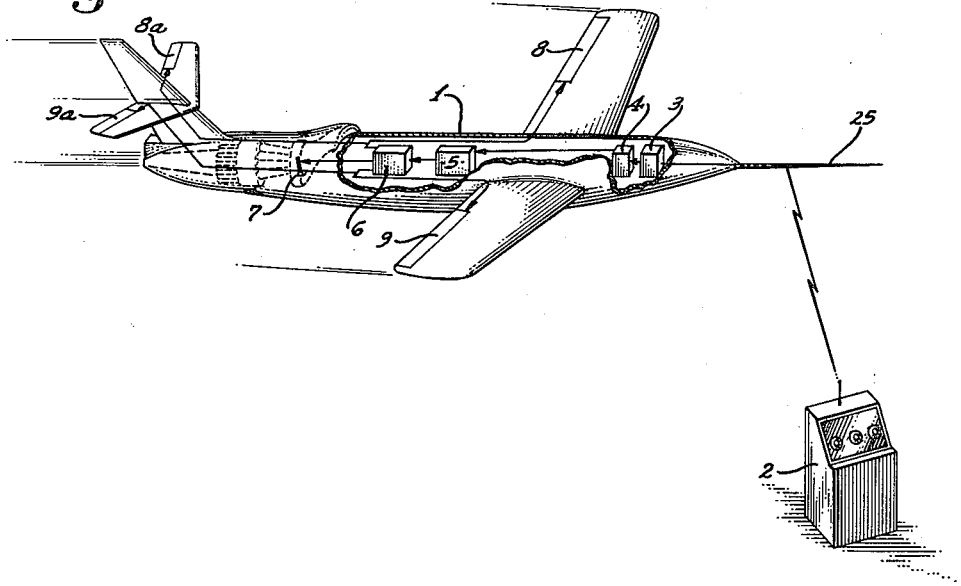
FIGURE 1 is a perspective view of an aircraft under control from a remote ground station, diagrammatically showing the transmitting and airborne equipment.

Referring first to FIGURE 1 for a detailed description of this invention, an aircraft 1 is operated by a control system comprising a transmitting station 2, on the ground or in another aircraft, and airborne equipment including a receiver 3, selector unit 4, autopilot control unit 5, and autopilot amplifiers and servo units 6. An engine throttle 7, and two aileron control surfaces 8 and 9, and pitch control surfaces 8a and 9a on the aircraft 1 are controlled directly by these servo units 6. Some auxiliary aircraft equipment can also be controlled by the remote radio system, but as these auxiliary functions do not have a direct bearing on the present invention, their description will not be included in this specification.

Figure 2:
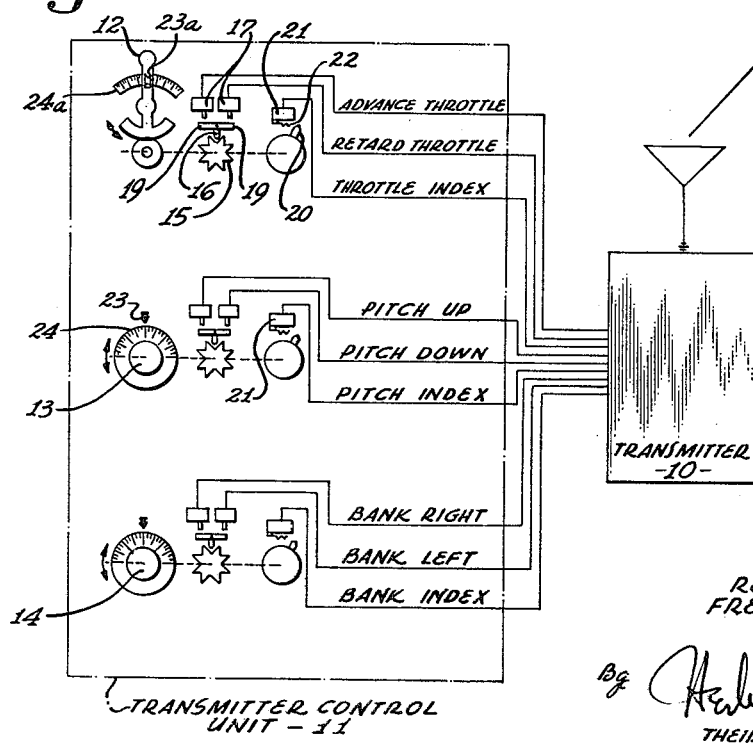
FIGURE 2 is a schematic diagram showing a transmitter and a transmitter control unit containing various control switches and knobs for operating the remote craft of FIGURE 1 according to the present invention.

At the transmitting station 2 is located a transmitter 10 and a transmitter control unit 11, as shown in FIGURE 2. The unit 11 contains a manually operated throttle control lever 12, pitch control knob 13, and bank control knob 14. Attached to be rotated by each respective control knob or lever is a star wheel 15 arranged to deflect a switch toggle 16 in one or two directions and then let the toggle return to neutral when the star wheel is rotated one notch in one direction. Opposite toggle deflection results from opposite star wheel rotation, and two spring-loaded control switches 17 are mounted to be respectively actuated on and off by heels 19 of the toggle 16 during deflection thereof.

In addition to the star wheel 15, an actuator finger 20 is directly turned by each control knob, and a synchronizing switch 21, having a double headed actuating plunger 22, is located in position to be contacted by the finger 20. At a neutral reference position of its associated control knob or lever, the finger 20 rests in the center of the actuating plunger 22 so that the synchronizing switch 21 is non-actuated. This neutral reference position is referred to as the index position, and it is seen that whenever the throttle lever 12, pitch knob 13, or bank knob 14 is turned from either side position into its index position, its respective synchronizing switch 21 will be actuated through one cycle.

The three manual controls 12, 13, and 14 are each preferably provided with position indicating means such as a pointer 23 or 23a and a calibrated dial 24 or 24a, and the transmission ratio between the lever or knob and the star wheel 15 is such that a rotation of one calibration mark causes a displacement of one notch of the star wheel. Thus, for each one-point movement of the throttle lever 12, for example, one of the control switches 17 is actuated on and off to produce one "pulse" and, in addition, whenever the index position is reached, a separate "pulse" will be produced by the synchronizing switch 21. These control units are shown, described and claimed in a separate copending application, Serial No. 152,042, filed March 27, 1950, now Patent No. 2,774,864.

Each control switch 17 and synchronizing switch 21 is wired into a separate modulation circuit in the transmitter 10. In this example, nine different audio oscillators (not shown) are provided in the transmitter 10, together with the necessary relays and other conventional equipment, each oscillator being operatively connected into the transmitting circuit when its corresponding control switch is actuated, as is well known to those skilled in the art. In other words, a control tone is transmitted for the short period of time taken in turning from one calibrated control knob position to the next position, and the frequency of the tone depends upon which particular switch is operated. Two or more switches may be operated simultaneously to send more than one control tone.

The transmitting equipment as described may be located at a ground station, as shown in FIGURE 1, or be mounted in a "chase" vehicle or airplane, or duplicated in several locations for alternate control. In the aircraft 1, or other device to be remotely controlled, the transmitted signal is picked up by a receiver antenna 25.

In the receiver 3, the signals are demodulated and amplified in any conventional way, such as by a frequency-modulated radio system, and then fed to the selector unit 4 which contains the customary selective filters which pass or reject any particular audio tone according to its frequency. The filters are, of course, individually tuned to the same frequencies as the respective nine control oscillators, so that a 1000-cycle signal, for example, will be passed by the 1000-cycle filter only, thus giving nine output channels from the selector unit 4.

It will be noted that for each attitude control knob in FIGURE 2, there are three signal channels, two of which govern movement of the respective function in opposite directions, and the third giving a synchronizing signal at the index position only, as indicated by the labels on the respective output leads. These same function channels are now present again in the aircraft at the input to the autopilot control unit 5, as shown in FIGURE 3.

The three channels from a single transmitter control lever or knob are connected to control the position of one of three stepping potentiometers 26 in the autopilot control unit 5, as will be described in detail. These stepping potentiometers 26 are the controlling members of an autopilot 27 and throttle servo 29 mechanisms which in turn control the positions of the throttle 7 and control surfaces 8 and 9 and 8a and 9a in the usual manner. Mixing circuits in the autopilot 27 cause simultaneous up and down movements of surfaces 8a and 9a together for pitch control, and simultaneous movement of both ailerons in opposite directions from each other for bank control.

Reference is now made to FIGURE 4 to show exactly how the control pulse signals are converted into incremental movements of the stepping potentiometers 26 and how the indexing feature is obtained. This figure will be described as applying to the pitch control system only, it being understood that the throttle and bank systems each have components equivalent to this one in operation. Here a dual stepping relay assembly comprises a down solenoid stepping coil 30, up solenoid stepping coil 31, ratchet wheel 32, and direction sensing cam 34, with the ratchet wheel and cam being mechanically connected to rotate together, and a control arm 35 of the stepping potentiometer 26 also connected to rotate or move with the wheel and cam. Ratchet members (indicated only by dashed line 36) act to displace the ratchet wheel 32 for one notch in the "down" direction each time the down stepping coil 30 is energized and deenergized, and to displace the wheel for one notch in the "up" direction each time the up stepping coil 31 is energized and deenergized, thus moving the control arm 35 in definite steps in either direction along the stepping potentiometer 26.

A "pitch up" wire 37 and a "pitch down" wire 39 lead through the closed lower contact set of a first and second holding relay 40 and 41, respectively, to connect to the upper ends of the up stepping coil 31 and down stepping coil 30, respectively, of the stepping relay assembly, through an up signal wire 42 and a down signal wire 44. The lower ends of the coils 30 and 31 are grounded, and the design is such that when a pitch control tone is received, a 28-volt D.C. pulse is applied to either the "pitch up" wire 37 or the "pitch down" wire 39 to energize the corresponding coil 30 or 31, and thus actuate the stepping potentiometer 26 as described. The holding relays 40 and 41 are assumed inactive for this phase of the operation, since they remain non-energized at all positions except index.

The stepping potentiometer 26 is supplied with a constant A.C. voltage 45, this being part of the servo system of the automatic pilot 27, which is well known. A pitch signal is thus derived from the control arm 35 to move the surfaces 8a and 9a in pitch-controlling direction in accordance with movement of the control arm 35.

It is thus seen that the steps made by the ratchet wheel 32 and control arm 35 give control changes in the form of definite increments of motion. They are definite because sufficient energy is provided to close the necessary relays when the control switches 17 are operated. By relay action, the stepping potentiometer 26 is moved by the same amount each time a control switch is closed and opened. Since the pulses are actually on-off signals, continuous stable operation is not depended on for keeping the control surfaces or throttle in a certain steady position, and zero-drift is entirely eliminated.

By governing the travel of each potentiometer control arm per step, small or large control increments are enabled. In one embodiment of the present method, a throttle controller and a pitch controller each are provided with 78 steps within the normal operating range. This accomplishes, in practice, the effect of a continuously variable control, in making the response smooth and proportional to input displacement. The rate of response is also proportional, since the stepping relays will operate fast or slow, in accordance with the speed of control knob rotation.

Referring again to FIGURE 4, the direction sensing cam 34, shown diagrammatically, is provided with two followers 46 and 47 which are both shown resting on a sliced-off flat surface 29 so that two direction switches 50 and 51, respectively, controlled by the followers 46 and 47, are in a circuit-open position. This position corresponds to the index position of the surfaces 8a and 9a as far as pitch angle is concerned, and is the only position where both direction switches 50 and 51 are open. In this index position, the surfaces are preferably in a neutral, level flight position, and the control arm 35 is positioned substantially at the electrical mid-point of the stepping potentiometer 26.

When the up stepping coil 31, for example, is energized once, the cam 34 will rotate in the clockwise direction far enough to move the up follower 46 to the outer circumference surface 52 of the cam 34, and thereby close the up direction switch 50. The surfaces 8a and 9a are now moved to place the aircraft 1 in a shallow climb of the number of degrees corresponding to one increment of control angle change, according to the procedure given above. For all other angles of climb, the up direction switch 50 remains closed and the down direction switch 51 remains open. Conversely, whenever the surfaces are operated in pitch to put the aircraft 1 into any nose down position on the opposite side of index position, the down direction switch 51 will be closed by the down follower 47 and the up direction switch 50 remains open.

Operation of the direction switches 50 and 51 controls the action of an up sense relay 54 and a down sense relay 55 as follows. These are three pole, double throw relays having one end of the relay coil grounded and the other end connected to the non-actuated position of the upper contact set of the opposite sense relay, as by cross wires 56. These relays each have an upper, middle and lower set of contacts, each set comprising a switch pole 57 movable between a pair of contacts referred to in this specification by the terms "actuated position" 59, which is the top contact position occupied by the switch pole 57 when the relay is energized, and "non-actuated position" 60, which is the bottom contact position. The upper switch pole of the up sense relay 54 is connected by a first cam wire 61 to one side of the down direction switch 51, and the upper switch pole of the down sense relay 55 is connected by a second cam wire 62 to one side of the up direction switch 50. The other side of each direction switch is connected to an electrical supply source 64, such as the usual +28 volts D.C. power mains in the aircraft 1.

Connected in this manner, both the sense relays 54 and 55 will be deenergized in the index position of the pitch controls, with the relay contacts occupying the lower position as shown in FIGURE 4. The up sense relay 54 will be energized at all times when the pitch controls are up from index, and the down sense relay 55 will be energized at all times when the pitch controls are down from index, as determined by the direction sensing cam 34.

An index signal wire 65, which carries a 28 volt D.C. pulse from the selector unit 4 when the synchronizing switch 21 of the pitch control knob 13 is actuated, is connected to one end of a single pole indexing relay 66, the other end of which is grounded. One side of the indexing relay contacts 67, normally open, is connected to the electrical supply source 64, and the other side is connected to the upper coil ends of the first and second holding relays 40 and 41. The lower coil ends of these relays are joined together and connected by a transfer wire 69 to the middle switch pole of both the sense relays 54 and 55. The actuated position of the middle contact set of each sense relay is connected to a ground wire 70, so that if either the up or down sense relay is energized, both holding relays 40 and 41 will be completed to ground at their lower ends. It is thus seen that an indexing pulse flowing through the indexing relay 66 will close this relay and supply +28 volts to the upper ends of the holding relays 40 and 41, which will be actuated if the pitch position of the surfaces 8a and 9a is on either side of index.

A power wire 71 also connects the supply source 64 to the actuated position of the upper contact set of the second holding relay 41, a jumper 72 connects the upper switch pole of the second holding relay 41 to the actuated position of the upper contact set of the first holding relay 40, and a holding wire 74 connects the upper switch pole of the first holding relay 40 to the upper coil ends of both holding relays. This insures that when an indexing pulse causes energization of the holding relays 40 and 41, as described above, these holding relays will remain energized after the indexing pulse ceases until both of the sense relays 54 and 55 are deenergized as a result of the direction cam 34 reaching index position.

In the event that the stepping relay assembly and the potentiometer 26 are not in index position when the pitch control knob 13 is turned to index, a series of synchronizing pulses from an indexing pulser 75 are fed to the proper stepping coil 30 or 31 as will now be shown. The pulser 75 comprises a single pole double throw pulsing relay 76 having a switch blade 77 working between top and bottom contacts 79 and 80, respectively. The switch blade 77 touches the bottom contact 80 when the pulsing relay 76 is energized, and is spring-loaded to touch the top contact 79 when the relay is deenergized. A stabilizing condenser 81 is connected across the pulsing relay 76, the lower end of which is grounded and the upper end of which connects through a timing resistor 82 to the top contact 79. The switch blade 77 connects to the +28-volt supply source 64, and the bottom contact 80 connects to a pulse output wire 84. An arc suppressor condenser 85 and suppressor resistor 86 are connected in series between the bottom contact 80 and the switch blade 77.

Whenever the power is turned on, the pulser 75 is operating. Because of the spring-load, the switch blade 77 is brought to touch the top contact 79, whereupon the +28 volts is applied through the timing resistor 82 to energize the pulsing relay 76 and bring the switch blade 77 to touch the bottom contact 80. This breaks the relay circuit and the blade returns to the top contact 79 to begin another cycle. In the specific apparatus shown herein, the indexing pulser 75 makes about 15 cycles per second, and 15 pulses per second are therefore fed into the pulse output wire 84 by reason of the switch blade 77 making intermittent contact with the bottom contact 80. To arrive at this particular pulse frequency, the following part values are preferred: pulsing relay 76, about 25,000 ohms resistance; timing resistor 82, 20,000 ohms; stabilizing condenser 81, 1 mfd. Also, a 1 mfd. arc suppressor condenser 85 and a 56 ohm suppressor resistor 86 are used.

The pulse output wire 84 is connected to the middle switch pole of the first holding relay 40. The actuated position of the middle contact set of this relay is wired by an interconnector 87 to the actuated position of the second holding relay 41 middle contact set, and the middle switch pole of the second holding relay 41 is connected by an index feeder wire 89 to the lower switch poles of both the sense relays 54 and 55. The actuated position of the lower contact set of the up sense relay 54 is connected to the upper end of the down stepping coil 30, in parallel with the down signal wire 44, and the actuated position of the lower contact set of the down sense relay 55 is connected to the upper end of the up stepping coil 31, in parallel with the up signal wire 42.

It is thus seen that the pulse output wire 84 from the indexing pulser 75 will be connected to the down stepping coil 30 when both holding relays 40 and 41 and the up sense relay 54 are energized, and connected to the up stepping coil 31 when both holding relays and the down sense relay 55 are energized. Both sense relays 54 and 55 are never energized at the same time. Therefore, assuming the aircraft 1 to be in a pitch attitude of one or more increments down from the index position when the pitch control knob 13 is moved into index, for example, the down sense relay 55 is energized as previously described, thus allowing the index pulse from the synchronizing switch 21 through the index signal wire 65 to cause energization of the holding relays 40 and 41, and thereby to connect the indexing pulser 75 to the up stepping coil 31 to actuate the potentiometer control arm 35 and all stepping relay parts toward the index position. Upon reaching the index position, the down sense relay 55 will be deenergized by cam and direction switch action, which will immediately disconnect the pulser from the stepping coil, cause the holding relays 40 and 41 to become deenergized and thus leave the system in the index position. During the indexing procedure, the "pitch up" wire 37 and "pitch down" wire 39 are open circuited by the lower contact set of the holding relays 40 and 41.

It will be noted that synchronization of the incoming indexing signal with the pulse cycles from the indexing pulser 75 is not necessary, since the circuit will always be returned to index position regardless of any fractional starting pulses which may be fed to the stepping coil 30 or 31 when the index signal is first received.

When the remote transmitter controls are moved out of the index position in either direction, normal system operation, as described in the earlier part of this disclosure, is in effect to move the controlled function one increment for each control pulse transmitted. For the pitch control each calibrated knob position corresponds to a certain pitch angle of the aircraft 1, which may amount to 0.5 degree per increment for example, in accordance with the stepping potentiometer design. For bank control, each calibrated knob position may be designed to give a change in bank angle of 2 degrees for example, with the index position corresponding to 0 degrees of bank. Throttle control is similarly obtained by dividing the entire range of engine speeds into suitable increments of the throttle stepping potentiometer and correlating the index position with a desired preset value.

The indexing pulser 75 may provide the indexing pulses for all indexing circuits in the autopilot control unit 5, by connecting other pulse output wires, such as 84a in FIGURE 4, in parallel between the first pulse output wire 84 and the proper contacts of the holding relays in the throttle and bank indexing circuits. Of course, separate pulsers having similar or dissimilar characteristics can be used for each index circuit, if desired. The pulser may also be provided with switching means to cause it to operate only when used for an indexing procedure, within the scope of this invention.

It is thus seen that the present invention provides a means and method of remotely controlling an aircraft or vehicle of any type with the assurance that the controlled position will always be in synchronization with the controller unit at the index positions, and wherein zero-drift is eliminated by using pulses exclusively for control signals.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A control system for remotely controlling the attitude of a device having a control member movable in either of two directions, which comprises electrical remote control pulse forming means, a radio transmitter having three modulators each adapted to produce a different, predetermined modulation frequency on a carrier wave of said transmitter when operatively connected therewith, said control pulse forming means arranged to operatively connect any of said modulators into said transmitter, at will, for a period of time equal to the width of each control pulse formed, the periods of said modulation frequencies being substantially less than the width of a control pulse, a receiver associated with said device and having a demodulator, three selective filters connected to said demodulator and individually tuned to pass each of said modulation frequencies, respectively, first control means connected to one of said filters to be energized only while the first of said modulation frequencies is being transmitted, second control means connected to another of said filters to be energized only while the second of said modulation frequencies is being transmitted, dual-direction stepping means connected to both of said control means and having a stepping member arranged to be displaced one unit in one direction when said first control means is energized and displaced one unit in the opposite direction when said second control means is energized, driving means from said stepping member to said control member, said stepping member and said control member having a common reference index position, additional pulse generating means mounted in said device, index control means connected to the third of said filters to be energized only when the third of said modulation frequencies is transmitted, direction sensing means connected to move in accordance with said stepping member, said index control means and said direction sensing means having contacts electrically connected in series between said additional pulse generating means and said dual-stepping means to complete a first index circuit therebetween only when said index control means is energized and when said stepping member is out of said index position in one direction, and to complete a second index circuit therebetween only when said index control means is energized and when said stepping member is out of said index position in the opposite direction, said indexing circuits, when completed, carrying indexing pulses initiated by said additional pulse generating means and respectively connected to said dual-stepping means in parallel with said first and second control means, the contacts of said direction sensing means being connected in the respective indexing circuit which, when completed, will cause incremental displacement of said stepping member one unit for each of said indexing pulses in a direction toward said index position, whereby whenever a remote control pulse at said third modulation frequency is transmitted, said control member is automatically moved to index position if not already there.

2. Apparatus in accordance with claim 1 wherein said additional pulse generating means is continuously operating while said control system is in use, but operatively connected to move said stepping member only when one of said index circuits is completed.

3. Apparatus in accordance with claim 1 wherein means are provided to disconnect said first and second control means from said dual-stepping means when either of said index circuits is completed, and to reconnect said first and second control means when both of said index circuits are open.

4. Apparatus in accordance with claim 1 wherein holding means are provided to maintain said index control means energized as long as said stepping member is out of said index position, regardless of discontinuance of the control pulse at said third modulation frequency during an indexing procedure.

5. A control system for remotely controlling the attitude of a device having a control member movable in either of two directions, which comprises electrical remote control pulse forming means, a radio transmitter having three modulators each adapted to produce a different, predetermined modulation frequency on a carrier wave of said transmitter when operatively connected therewith, said control pulse forming means arranged to operatively connect any of said modulators into said transmitter, at will, for a period of time equal to the width of each control pulse formed, the periods of said modulation frequencies being substantially less than the width of a control pulse, a receiver associated with said device and having a demodulator, three selective filters connected to said demodulator and individually tuned to pass each of said modulation frequencies, respectively, first control means connected to one of said filters to be energized only while the first of said modulation frequencies is being transmitted, second control means connected to another of said filters to be energized only while the second of said modulation frequencies is being transmitted, dual-direction stepping means connected to both of said control means and having a stepping member arranged to be displaced one unit in one direction when said first control means is energized and displaced one unit in the opposite direction when said second control means is energized, driving means from said stepping member to said control member, said stepping member and said control member having a common reference index position, additional pulse generating means mounted in said device, index control means connected to the third of said filters to be energized only when the third of said modulation frequencies is transmitted, direction sensing means connected to move in accordance with said stepping member and having one electrical input and two electrical outputs, said input being disconnected from both said outputs at said index position, said input connected to one of said outputs only when said stepping member is in a position on one side of said index position, and said input connected to the other of said outputs only when said stepping member is on the opposite side of said index position, means for conducting indexing pulses from said additional pulse generating means to said direction sensing means input only when said index control means is energized, said direction sensing means outputs being respectively connected to said dual-stepping means in parallel with said first and second control means in the proper order to cause incremental displacement of said stepping member one unit for each of said indexing pulses in the direction toward said index position, when said index control means is energized at a stepping member position away from said index.

6. In a pulse-operated remote control system for controlling the attitude of a device having a control member movable in either of two directions, means for synchronizing said control member with a remote operating element at a predetermined index position which comprises a synchronizing signal input line adapted to carry a synchronizing signal when said remote operating element is moved to index position, index pulse generating means associated with said device, index control means connected to said input line to be energized only while said synchronizing signal is present, direction sensing means connected to move in accordance with said control member and having one electrical supply line and two electrical output lines, said supply line being disconnected from both said output lines at said index position, said supply line connected to one of said output lines only when said control member is in a position on one side of index, and said supply line connected to the other of said output lines only when said control member is on the opposite side of index, means for conducting indexing pulses from said pulse generating means to said direction sensing means supply line only when said index control means is energized, dual-direction stepping means electrically connected to both of said output lines and having a stepping member arranged to be incrementally displaced one unit in one direction for each indexing pulse delivered through one of said output lines and incrementally displaced one unit in the opposite direction for each indexing pulse delivered through the other output line, and driving means connected from said stepping member to said control member in the proper sense so that said displacements drive said control member toward said index position when said index control means is energized at a control member position away from index.

7. Apparatus in accordance with claim 6 wherein said synchronizing signal is an electrical pulse and wherein holding means are provided to maintain said index control means energized after initial energization thereof as long as said control member is out of index, regardless of the discontinuance of said synchronizing pulse during an indexing procedure.

8. Apparatus in accordance with claim 6 wherein said pulse generating means is continuously operating while said control system is in use, but operatively connected to move said stepping member only when said index control means is energized and when said supply line is connected to one of said output lines.

9. A pulse-operated incremental remote control system for an aircraft having a control member movable in either of two directions, which comprises remote means for transmitting a first control signal at a first frequency in the form of pulses each comprising a substantial number of cycles at said first frequency, remote means for transmitting a second, similar control signal at a second frequency, electrically operated stepping means having a positive driving connection with said control member and connected in respective receiving selector circuits to be energized and moved one step in one direction only when one pulse of said first control signal is transmitted and to be moved one step in the opposite direction only when one pulse of said second control signal is transmitted, said stepping means and said control member having a common reference index position, and remote controlled indexing means operative in addition to said first and second control signals for moving said control member to said index position comprising remote means for transmitting a third similar control signal at a third frequency, index pulse forming means mounted in said aircraft adapted to produce a series of electrical indexing pulses, index control means adapted to be energized only when said third control signal is transmitted, direction sensing means connected to move in accordance with said stepping means, said index control means and said direction sensing means having contacts electrically connected in series between said index pulse forming means and said stepping means to complete a first index circuit therebetween only when said index control means is energized and when said stepping means is out of said index position in one direction, and to complete a second index circuit therebetween only when said index control means is energized and when said stepping means is out of index in the opposite direction, each of said index circuits being respectively connected to operate said stepping means one step for each of said indexing pulses in a direction toward said index position when one pulse of said third control signal is transmitted at a control member position away from index.

10. Apparatus in accordance with claim 9 wherein said first and second control signal transmitting means include an operating member movable in one direction for producing control pulse signals of said first frequency and movable in the opposite direction for producing control pulse signals of said second frequency, said operating member having a plurality of positions corresponding respectively to a plurality of positions, including said index position, of said control member, and wherein said third control signal transmitting means has an actuated connection with said operating member at said index position only to transmit one index pulse signal of said third frequency whenever said operating member enters said index position from either side thereof.

11. Apparatus in accordance with claim 9 wherein said aircraft contains an automatic pilot connected to control the attitude of said aircraft about one of its major axes in accordance with the position of an input member, and wherein said control member and said input member are one and the same.

12. Apparatus in accordance with claim 9 wherein said index pulse forming means comprises a sensitive single pole, double throw relay having a normal position where said pole is contacting the first of said throw positions, the actuating coil of said relay having a connection from one end thereof to said first throw position, an electrical power source, a connection from the other end of said coil to one side of said power source, a connection from said pole to the other side of said power source, and a pulse output connection at the second of said throw positions, whereby a continuous series of index pulses is available from said output connection due to the intermittent contacting of said pole with said second throw position.

13. Apparatus in accordane with claim 9 wherein said direction sensing means comprises a cam having a positive driven connection with said stepping means, a pair of cam-driven direction switches, the contour of said cam being such that both said switches are open when said stepping means is in said index position, the first of said switches, only, is closed when said stepping means is on the opposite side of index, a pair of direction relays, an electrical power source, a first series circuit comprising said power source, said first direction switch, and the first of said direction relays, a second series circuit comprising said power source, said second direction switch, and the second of said direction relays, and a separate pair of normally open relay contacts operated by each of said direction relays, one pair of said relay contacts connected in said first index circuit, and the other pair of said relay contacts connected in said second index circuit.

14. A pulse-operated remote control system for an aircraft having a control member movable in either of two directions, which comprises remote means for transmitting a first control signal at a first frequency in the form of pulses each comprising a substantial number of cycles at said first frequency, remote means for transmitting a second similar control signal at a second frequency, electrically operated stepping means having a positive driving connection with said control member and connected in respective receiving selector circuits to be energized and moved one step in one direction only when one pulse of said first control signal is transmitted and to be moved one step in the opposite direction only when one pulse of said second control signal is transmitted, said stepping means and said control member having a common reference index position, remote means for transmitting a third similar control signal at a third frequency, and indexing means operative in response to one pulse signal at said third frequency to move said stepping means into said index position if not already there.

15. Apparatus in accordance with claim 14 wherein a single remote, multiple position, operating member is provided to actuate said first and second control signal transmitting means respectively when moved in opposite respective directions, the rate of actuation being one pulse for a unit of movement of said operating member, and wherein said third control signal transmitting means is automatically actuated by said operating member to produce one pulse at said third frequency when said operating member is moved to the position normally corresponding to the index position of said control member, whereby said control member is automatically synchronized with said operating member at said index position, regardless of the loss of any pulses of said first and second control signals or the previous acquisition of spurious signals.

16. Apparatus in accordance with claim 14 wherein said first and second control signal transmitting means include an operating member movable in one direction for generating control pulse signals of said first frequency and movable in the opposite direction for generating control pulse signals of said second frequency, said operating member having a plurality of positions corresponding respectively to a plurality of positions, including said index position, of said control member, and wherein said third control signal transmitting means has an actuated connection with said operating member at said index position only to transmit one index pulse signal of said third frequency whenever said operating member enters said index position from either side thereof.

References Cited in the file of this patent

UNITED STATES PATENTS

| | | |
|---|---|---|
| 1,553,650 | Trenor | Sept. 15, 1925 |
| 2,163,411 | Seeley | June 20, 1939 |
| 2,420,693 | White | May 20, 1947 |
| 2,495,304 | Wyckoff et al. | Jan. 24, 1950 |
| 2,580,453 | Murray et al. | Jan. 1, 1952 |